United States Patent [19]

Zerlik

[11] 4,375,823

[45] Mar. 8, 1983

[54] WATER DISTRIBUTOR

[75] Inventor: Willibald Zerlik, Birr, Switzerland

[73] Assignee: BBC Brown, Boveri & Company, Limited, Baden, Switzerland

[21] Appl. No.: 242,273

[22] Filed: Mar. 10, 1981

[30] Foreign Application Priority Data

Mar. 10, 1980 [EP] European Pat. Off. ............ 80200226

[51] Int. Cl.³ ..................... F16K 49/00; F16L 53/00
[52] U.S. Cl. ..................................... 137/340; 62/505; 137/580; 310/59
[58] Field of Search .................. 62/505, 331; 310/52, 310/54, 62, 59; 137/340, 580

[56] References Cited

U.S. PATENT DOCUMENTS

| | | | |
|---|---|---|---|
| 3,458,738 | 7/1969 | Pohl | 310/64 |
| 3,487,243 | 12/1969 | Wiedemann et al. | 310/64 |
| 3,510,701 | 5/1970 | Ivanov | 310/64 |
| 3,543,062 | 11/1970 | Banchieri | 310/64 |
| 3,918,486 | 11/1975 | Cyphelly | 137/580 |
| 3,939,368 | 2/1976 | Albaric et al. | 310/59 |
| 3,955,110 | 5/1976 | Karlen | 310/59 |

Primary Examiner—Ronald C. Capossela
Attorney, Agent, or Firm—Oblon, Fisher, Spivak, McClelland & Maier

[57] ABSTRACT

In the coil end of a rotor of an electrical machine, the terminal ends emerging from different grooves and resting on different cylindrical surfaces must be electrically connected with each other and hydraulically with a water chamber. This is accomplished by distributors which include a connecting stud and two shanks which extend therefrom. The shanks have bores which extend at an acute angle into a bore on the connecting stud. This causes only very small flow resistance. The freedom that is gained in terms of choosing the desired shank lengths, and the freedom to choose the interval between the free shank endings, gives rise to a number of production advantages. Furthermore, the quality tests for checking the junction of the distributor pieces with the terminal endings of the windings are simplified.

3 Claims, 5 Drawing Figures

WATER DISTRIBUTOR

BACKGROUND OF THE INVENTION

1. Field of the Invention

This invention relates to a distributor for the electric and hydraulic junction between the individual conductor terminals which emerge from different grooves and extend in different cylindrical surfaces along the coil end of the rotor of an electrical machine, and the pipe conduits which serve as inlet and/or outlet of the cooling medium, as well as a process for the manufacture of this type of distributor.

2. Description of the Prior Art

In the case of electrical machines using liquid cooled rotor windings, the cooling medium is led to or taken from the conductors via flexible electrically insulated conduits. The junction of the conduit with the winding within the coil end of the rotor is provided via water distributors. These distributors also constitute the electrical connection between the terminal ends themselves. The water distributors are, in general, mounted in the axially most extreme and most easily accessible radial plane of the coil end which allows for a simple attachment of the water connections, and the water distributors constitute a part of the windings (H. Sequenz; *Manufacture of Windings for Electrical Machines;* published by Springer Verlag, 1973; p. 171).

SUMMARY OF THE INVENTION

It is the object of this invention to provide a distributor which allows for both the electrical and hydraulic junction of terminal ends that entend in different cylindrical surfaces, and which is characterized by simple construction and good flow characteristics as well as an economical technique for the manufacture thereof.

The solution of the first portion of the above object is accomplished by providing the distributor with two shanks (blades) which project from one connecting branch (stud). The free endings of the shanks point in different directions and can be connected with terminal endings extending in radially different cylindrical surfaces and in which the shanks form and enclose an acute angle with one another at the junction with the stud. The shanks have bore-holes which open directly into a borehole of the connecting stud. The borehole in the connecting stud substantially aligns with a connecting portion of the borehole in one of the two shanks.

Since the hydraulic connection mostly extends along the smaller diameter cylindrical surface which adjoins the shaft of the machine, the pipe conduits between water distributor and water chamber are exposed to lesser centrifugal forces. That is, only the free end of one of the shanks is radially beyond the inner cylindrical surface.

The following main advantages result from the invention:

1. The design and shape of the borings produce a smaller resistance to the flow of the cooling medium since abrupt directional changes are avoided.
2. The single piece design requires the smallest possible number of welding and/or soldering joints.
3. Auxiliary borings which subsequently need again be sealed by an expensive process are not required.
4. The freedom to select shank lengths and their respective distances from one another makes it possible to produce the necessary junction pieces independent of each other. If need be, each by itself. Preferably, the distance of the free ends with respect to each other is approximately equal to the length of one shank, which is equal to approximately four times the length of the connecting stud. The shank lengths can be so dimensioned that when one junction is heated, the other (if premanufactured) is not detrimentally affected.

5. It is possible to provide one terminal ending with a water distributor already outside of the rotor.
6. During the connection of the distributor with the windings, the temperature in the connecting branch or stud (as a general rule provided with an inside thread) remains so low that the material is not adversely affected, which is of special significance in cases when the water distributor is made of copper.
7. Expensive refrigeration equipment to protect the threads of the connecting branch is not required.
8. Sealing tests and X-ray tests to determine the quality of the connecting joints from the water distributor to the terminal ends of the windings (welded or soldered joints) are simplified.

The process for the manufacture of a water distributor persuant to this invention is characterized by the following production steps:

Beginning with a single work piece blank which has essentially a rectangle form, a slit having the length of the desired shanks is cut in the longitudinal direction of the blank. One shank of the work piece is then bent away from the other shank. A blind-end bore is then made in the connecting stud in the direction of the non-bent shank. Two straight-line bore holes are then made in the longitudinal direction of the shanks whereby both borings extend to the blind-end bore hole. The originally bentaway shank is then returned into its initial position. Both shanks are then bent away from their original plane, and orthogonally from each other. Finally, the shanks are aligned to the different curvature gradients of the cylinder surfaces.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference character is designate like or corresponding parts throughout the several views, and wherein.

DETAILED DESCRIPTION OF THE PREFERRED EMBODIMENTS

Figure 1:
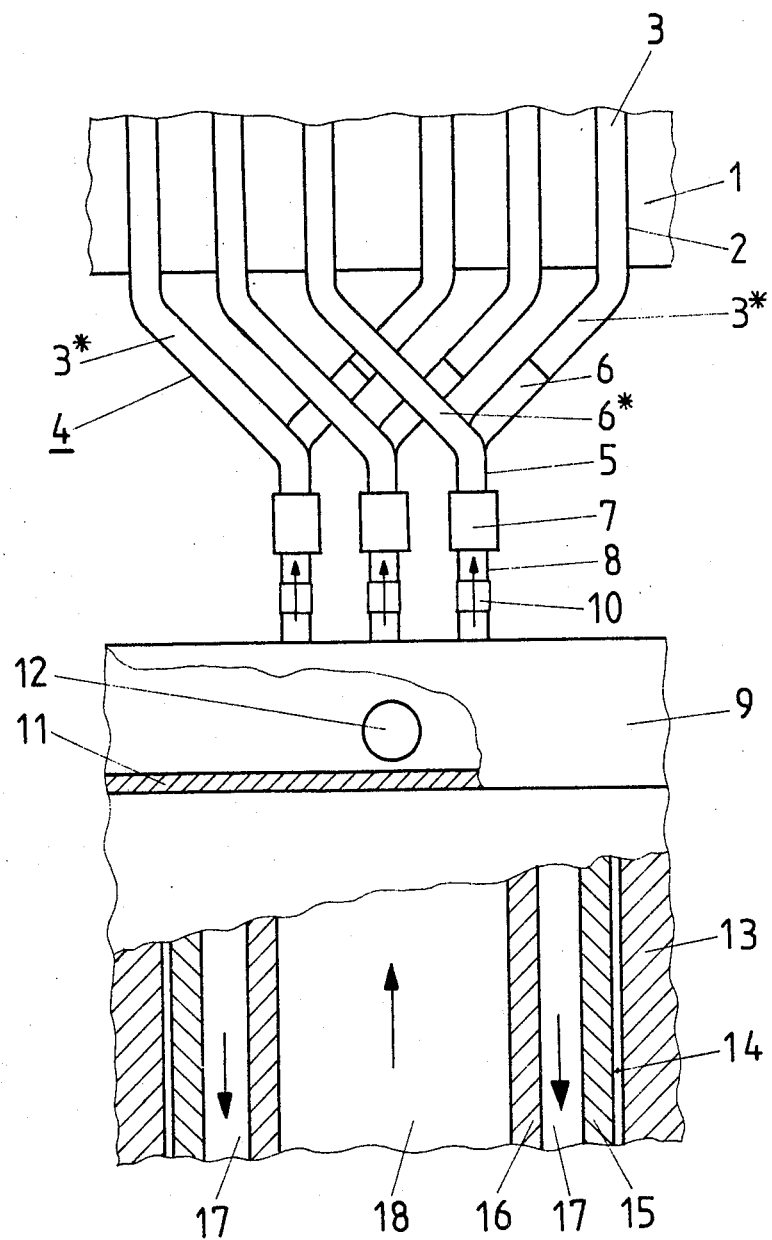
FIG. 1 is a schematic top view in partial cross-section of the rotor end of an electrical machine with a water cooled winding.

FIG. 1 shows the rotor 1 of an electrical machine, the terminal ends 3* of the windings 3 of said rotor coming from different grooves 2. Terminal ends 3* of pairs of said terminal ends extend along radially separated cylindrical surfaces at the coil end 4 of the rotor and are connected to each other via distributor pieces 5. The distributor pieces 5 are formed with two shanks 6 and 6* extending along different ones of said cylindrical surfaces and also extend into a connecting stud 7. The connecting studs 7 are joined to the pipe line 8 which communicates with the water chamber 9. Along the length of the pipe lines 8 are insulation sections 10 thereof (shown schematically in FIG. 1) which separate the electrical potential of the water chamber and the windings.

In FIG. 1, in partial section, is shown a part of the wall 11 and one of the inlet bore holes 12 of the water chamber 9.

Inside the rotor shaft 13, within a bore hole 14, is an exterior pipe 15 and a coaxial interior pipe 16 which form an exterior channel 17 to drain off the cooling water and a coaxial interior channel 18 to feed in the cooling water.

In the illustrated embodiment, a cold water chamber 9 is depicted. The cooling water flows from the interior channel 18 through a radially extending (not shown) pipe line and through the inlet bore hole 12 into the cold water chamber 9 and arrives via the pipe lines 8 and the distributors 5 into the windings 3 where it absorbs heat. The heated cooling water is then led via the distributor pieces 5 (which are displaced in the circumferential direction) and pipe lines (not shown) into a warm water chamber and exited into the external channel 17.

Figure 2:
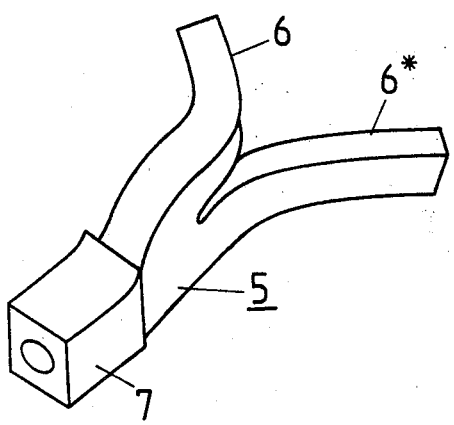
FIG. 2 is a perspective view of the distributor.
Figure 4:
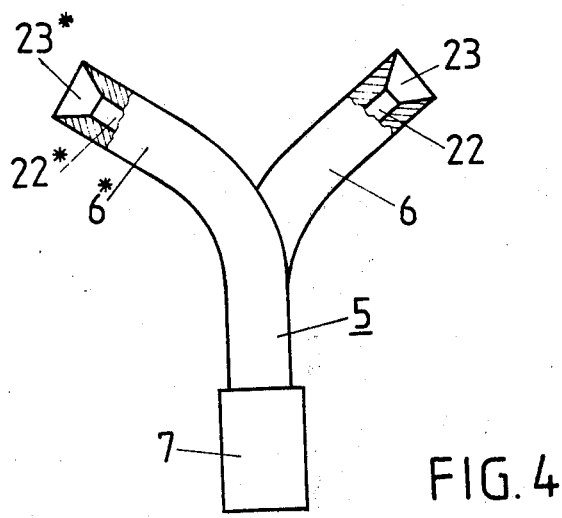
FIG. 4 is a top view of the distributor.
Figure 5:
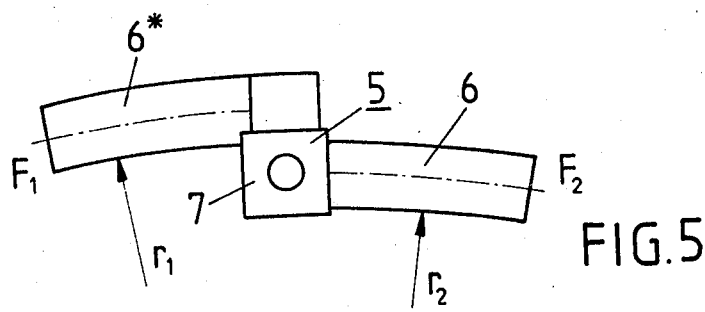
FIG. 5 is a front view of the distributor.

FIGS. 2, 4, and 5 depict different views of the distributor 5. The two shanks 6 and 6* extend from the connection branch 7. The two free ends of the shanks are bent in opposing directions and extend along radially spaced cylindrical surfaces $F_1$, $F_2$ having the radii $r_1$ and $r_2$ (see FIG. 5).

Figure 3:
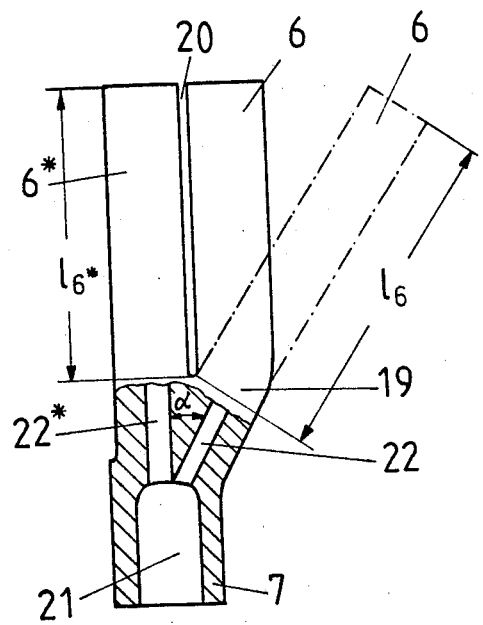
FIG. 3 is a side view in partial cross section of a partially manufactured production work-piece blank.

The manufacturing process for the distributor 5 is described in greater detail below:

As can be seen from FIG. 3, a basic single piece (blank workpiece) 19 is given a slit 20 in its longitudinal direction, of a length depending on the length $l_6$ or $l_{6*}$ of the desired shank. One shank 6 of the blank is bent away from the other shank in their common plane. A blindend bore hole 21 is made in the connecting stud 7 in the direction of the unbent shank 6*, as well as two straight-line bore holes 22 and 22* in the longitudinal direction of the shanks. Both bore holes 22 and 22* extend to the blind-end bore hole 21. The shank 6 which had been bent away is returned to its original position and as can be seen in FIG. 4, both shanks 6 and 6* are moved out of their original plane (see FIG. 3) and bent orthogonally to that plane. They are also then bent along cylindrical surfaces $F_1$ and $F_2$. The partial view depicted in FIG. 3 shows that the bore holes 22 and 22* of the two shanks 6 and 6* extend to the connecting stud 7 at an acute angle $\alpha$. Furthermore, it can be seen from FIG. 3 that the bore hole 21 aligns at the connecting stud 7 with the bore hole 22* in the shank 6*, within the shank section facing the stud. Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A distributor for the electric and hydraulic junction between the individual conductor terminals which emerge from grooves at the coil end of the rotor of an electrical machine and the pipe conduit which serves as the hydraulic inlet and/or outlet, each of said conductor terminals extending along one of two radially spaced cylindrical surfaces, said distributor comprising:

a connecting stud having a first bore therein;

a first shank connected to said stud at one end thereof and having a second bore therethrough, said second bore being in alignment with said first bore at said one end, said first shank being curved in one direction and having another end positioned on one of said cylindrical surfaces and connected to one of said conductor terminals; and a second shank connected to said stud at one end thereof and having a third bore therethrough, said second shank and third bore forming an acute angle with said first shank adjacent said one end thereof, said second shank being curved in a direction opposite said one direction and having another end positioned on the other of said cylindrical surfaces and connected to another of said conductor terminals.

2. The distributor of claim 1, wherein said first and second bores are located on the radially inner one of said two radially spaced cylindrical surfaces and said third bore is located partially on the other of said cylindrical surfaces.

3. The distributor of claim 1 wherein the length of said shanks is about four times the length of said stud and the distance between said other ends of said shanks is substantially equal to the length of said shanks.

* * * * *